US009163948B2

(12) United States Patent  
Hubbard et al.

(10) Patent No.: US 9,163,948 B2  
(45) Date of Patent: Oct. 20, 2015

(54) POSITION ACCURACY TESTING SYSTEM

(71) Applicants: Jonathan Hubbard, San Francisco, CA (US); Christopher A. Kantarjiev, Palo Alto, CA (US)

(72) Inventors: Jonathan Hubbard, San Francisco, CA (US); Christopher A. Kantarjiev, Palo Alto, CA (US)

(73) Assignee: SpeedGauge, Inc., San Francisco, CA (US)

(*) Notice: Subject to any disclaimer, the term of this patent is extended or adjusted under 35 U.S.C. 154(b) by 39 days.

(21) Appl. No.: 13/681,083

(22) Filed: Nov. 19, 2012

(65) Prior Publication Data

US 2013/0131976 A1 May 23, 2013

Related U.S. Application Data

(60) Provisional application No. 61/561,227, filed on Nov. 17, 2011.

(51) Int. Cl.
| | |
|---|---|
| *G01S 1/00* | (2006.01) |
| *G01S 1/24* | (2006.01) |
| *G01C 21/12* | (2006.01) |
| *G01C 21/10* | (2006.01) |
| *G01C 21/30* | (2006.01) |
| *G01S 19/23* | (2010.01) |

(52) U.S. Cl.
CPC ............. *G01C 21/30* (2013.01); *G01S 19/23* (2013.01)

(58) Field of Classification Search
CPC ...... G01C 21/005; G01C 25/00; G01C 19/00; G01C 21/30; G01C 17/30; G01C 15/04; G01C 21/20; G06F 17/21; G06F 3/011; G06F 17/30; G06F 9/4435; G06K 9/46; G06K 9/32; G06K 7/10; G01S 19/23; G01S 1/02; G01S 5/06; G01S 7/03; G01S 17/89; G01S 7/021
USPC ............... 701/412, 2, 1, 3, 475, 428, 433, 25, 701/408, 490, 530; 382/103, 169
See application file for complete search history.

(56) References Cited

U.S. PATENT DOCUMENTS

| | | | | |
|---|---|---|---|---|
| 5,374,933 | A * | 12/1994 | Kao | 342/357.31 |
| 6,385,539 | B1 * | 5/2002 | Wilson et al. | 701/468 |
| 6,785,551 | B1 * | 8/2004 | Richard | 455/456.1 |
| 7,057,364 | B2 * | 6/2006 | Ballas et al. | 318/466 |
| 7,552,008 | B2 * | 6/2009 | Newstrom et al. | 701/468 |
| 7,660,441 | B2 * | 2/2010 | Chen et al. | 382/113 |
| 8,249,807 | B1 * | 8/2012 | Barbeau et al. | 701/490 |
| 8,503,794 | B2 * | 8/2013 | Omer et al. | 382/209 |
| 8,612,135 | B1 | 12/2013 | Montemerlo et al. | |
| 2003/0023614 | A1 * | 1/2003 | Newstrom et al. | 707/104.1 |
| 2003/0144795 | A1 * | 7/2003 | Lin | 701/213 |
| 2003/0149527 | A1 * | 8/2003 | Sikila | 701/213 |
| 2005/0261833 | A1 * | 11/2005 | Brosius et al. | 701/213 |
| 2007/0014488 | A1 * | 1/2007 | Chen et al. | 382/294 |
| 2007/0129892 | A1 * | 6/2007 | Smartt et al. | 702/5 |

(Continued)

*Primary Examiner* — Calvin Cheung  
*Assistant Examiner* — Luis A Martinez Borrero  
(74) *Attorney, Agent, or Firm* — Lewis Roca Rothgerber LLP

(57) ABSTRACT

Accuracy of a positioning device may be determined without requiring the device to be at any specific location, such as a test location. Instead of comparing the reported location and directional data to a known location and directional data, the present technology may use multiple discrete location and directional reports for comparison with the reported data at multiple locations. The multiple comparisons are used to assess the relative accuracy of the positional telematics system. The reported location may be a GPS location or from another positioning system.

20 Claims, 8 Drawing Sheets

(56) References Cited

U.S. PATENT DOCUMENTS

| | | | |
|---|---|---|---|
| 2007/0233413 A1* | 10/2007 | Ohara | 702/106 |
| 2008/0046174 A1* | 2/2008 | Johnson | 701/209 |
| 2008/0046180 A1* | 2/2008 | Zohar et al. | 701/300 |
| 2008/0158059 A1* | 7/2008 | Bull et al. | 342/387 |
| 2008/0319655 A1* | 12/2008 | Vande Velde | 701/208 |
| 2009/0043504 A1* | 2/2009 | Bandyopadhyay et al. | 701/213 |
| 2009/0073035 A1* | 3/2009 | Percy et al. | 342/357.07 |
| 2009/0138497 A1* | 5/2009 | Zavoli et al. | 707/102 |
| 2009/0256743 A1* | 10/2009 | Chen et al. | 342/357.07 |
| 2010/0017115 A1* | 1/2010 | Gautama | 701/202 |
| 2010/0052990 A1* | 3/2010 | Bull et al. | 342/387 |
| 2010/0312461 A1* | 12/2010 | Haynie et al. | 701/117 |
| 2011/0123066 A9* | 5/2011 | Chen et al. | 382/103 |
| 2011/0235923 A1* | 9/2011 | Weisenburger et al. | 382/201 |
| 2011/0280453 A1* | 11/2011 | Chen et al. | 382/113 |
| 2011/0282578 A1* | 11/2011 | Miksa et al. | 701/208 |
| 2012/0027250 A1* | 2/2012 | Omer et al. | 382/103 |
| 2012/0035788 A1* | 2/2012 | Trepagnier et al. | 701/3 |
| 2013/0030692 A1* | 1/2013 | Hagan | 701/410 |
| 2013/0195362 A1* | 8/2013 | Janky et al. | 382/195 |
| 2013/0260797 A1* | 10/2013 | Jones et al. | 455/456.3 |

* cited by examiner

POSITION ACCURACY TESTING SYSTEM

CROSS REFERENCE TO RELATED APPLICATIONS

This application is a claims the priority benefit of U.S. Patent Application Ser. No. 61/561,227, titled "Position Accuracy Testing System," filed Nov. 17, 2011, the disclosure of which is incorporated herein by reference.

BACKGROUND OF THE INVENTION

Description of the Related Art

Positioning systems are used to determine the position of a device. One example of a positioning system is the Global Positioning System (GPS). GPS uses a series of space-based satellites to send signals which indicate the time the signal was transmitted, and the precise orbital information for the sending satellite. A GPS device receives the signals and determines the distance to each satellite. The distances to the satellites can be used with the known locations of the satellites to determine the location of the device.

Though the GPS system works well in theory, the accuracy of the readings from a GPS device may be affected by many factors. For example, distressed wires, improper installation, and other issues may affect the accuracy of the readings from a GPS device.

Methods exist for detecting the accuracy of a GPS device, but they have disadvantages. One method involves placing the device at a specific location, taking a reading from the device of the purported GPS coordinates, and comparing the reading to the known GPS coordinates for the specific location. Though this method provides a measure of the accuracy of the GPS unit at the specific location, it can be inconvenient to place the GPS device at the specific location—for example when the GPS device is used in a vehicle located a great distance away.

There is a need in the art for conveniently measuring the accuracy of GPS devices.

SUMMARY OF THE CLAIMED INVENTION

Accuracy of a positioning device may be determined without requiring the device to be at any specific location, such as a test location. Instead of comparing the reported location and directional data to a known location and directional data, the present technology may use multiple discrete location and directional reports for comparison with the reported data at multiple locations. The multiple comparisons are used to assess the relative accuracy of the positional telematics system. The reported location may be a GPS location or from another positioning system.

Accuracy of positional data may be determined by first selecting positional data points retrieved for a vehicle moving on a road to compare to geo-data points for the road. The positional data points may then be compared to the geo-data points. The accuracy of the positional data points may be determined based on the comparison.

DETAILED DESCRIPTION

The present technology determines the accuracy of a positioning device without requiring the device to be at any specific location, such as a test location. Instead of comparing the reported location and directional data to a known location and directional data, the present technology may use multiple discrete location and directional reports for comparison with the reported data at multiple locations. The multiple comparisons are used to assess the relative accuracy of the positional telematics system. The reported location may be a GPS location or another positioning system.

The present technology is useful in that the analysis may be conducted using locational and directional data collected from positional-equipped telematics systems which are actively used, such as vehicle tracking devices. As such, the vehicle trackers need not be brought to a specific location to determine the accuracy of the devices. Rather, the analysis may be performed based on past data collected for each device.

Figure 1A:
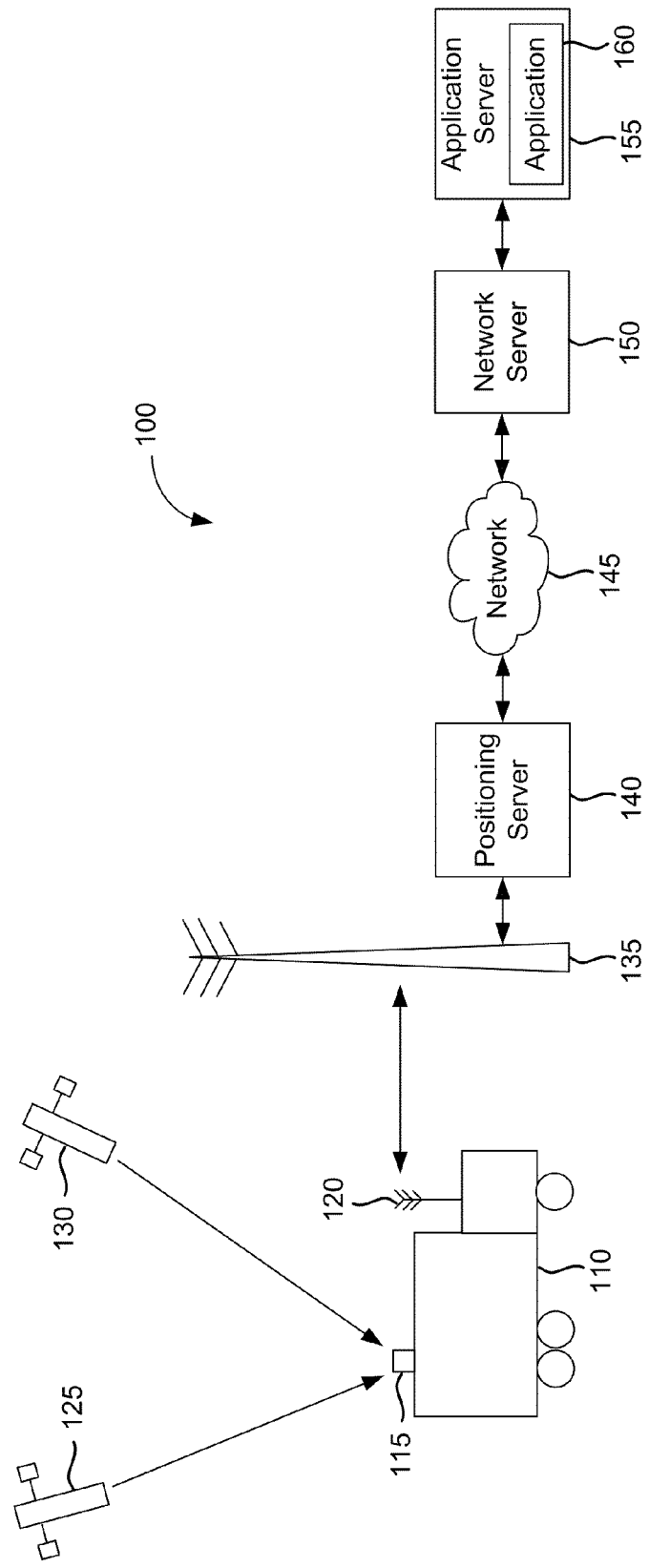
FIG. 1A illustrates an exemplary system for determining the accuracy of a GPS device.

FIG. 1A illustrates an exemplary system for determining the accuracy of a GPS device. The system of FIG. 1A includes vehicle 110, positioning satellites 125 and 130, wireless tower 135, positioning server 140, network 145, network server 150 and application server 155.

Vehicle 110 may be any vehicle or device that may travel along a road which are associated with geo-data. A road as referred to herein may include a public road, private road, highway, freeway, residential street, driveway, or other thoroughfare on which a vehicle may travel. The vehicle may be an automobile, shipping truck, motorized cycle, or some other vehicle. The geo-data may identify the location, heading, and typical speed (or range of speed) associated with different points on a road, path, highway, or other travel route for the vehicle.

The vehicle may include a positioning device 115 and cellular communication system 120. Positioning device 115 may receive signals from one or more positioning satellites 125 and 130 and determine its location based on the received signals. The positioning satellites may be part of a global, national or local positioning system. For example, the positioning satellites may be part of the Global Positioning System (GPS), and the positioning device may be a GPS device. As a GPS device, positioning device 115 may receive a signal from multiple GPS satellites, process the signals to determine a location for each satellite, and determine a location for itself (and therefore the vehicle).

Cellular communication system 120 within vehicle 110 may receive data from positioning device 115 and communicate the positioning data in position coordinates (e.g., GPS coordinates), identification data and other data by cellular communication to cellular tower 135. Devices 115 and system 120 may communicate via a wired connection, wireless connect (e.g., a radio frequency connection), or both. Cellular communication system 120 may be attached to a vehicle 10, a device within vehicle 10 but associated with a user (e.g., a cellular phone), or other device capable of communicating over a cellular network. Cellular tower 135 may then communicate the location information received for vehicle 110 to positioning server 140, which may be a GPS server. Though cellular networks and communication systems are discussed herein, other communication networks may be used to communicate the GPS and identity data to an application, such as but not include satellite communication technology.

Network server 150 may communicate with positioning server 140 through network 145 and with application server 155. Network server 150 may be implemented as one or more servers implementing a network service. The network server may receive positioning data, perform preliminary processing on the data, and provide the positioning data to application server 155. Positioning server 140, network server 150, and application server 155 may be implemented using the computing device discussed below with respect to FIG. 7.

Network 145 may facilitate communication of data between different servers, devices and machines, such as positioning server 140, network server 150, and application server 155. The network may be implemented, for example, as a private network, public network, intranet, the Internet, a wide area network, a local area network, or a combination of these networks.

Application server 155 may be implemented as one or more servers, includes application 160 and may communicate with network server 150 and other devices (not illustrated in FIG. 1). Application 160 may receive positioning data associated with positioning device 115 and received from network server 150, process the positioning data along with geo-data, and provide accuracy information related to the positioning data. A method for determining the accuracy information is discussed in more detail below with respect to FIG. 2.

FIGS. 1B-7 are discussed with reference to a GPS system. It is intended that the reference to a GPS system is for discussion purposes only, and that other positioning systems can be used with the present technology.

Figure 1B:
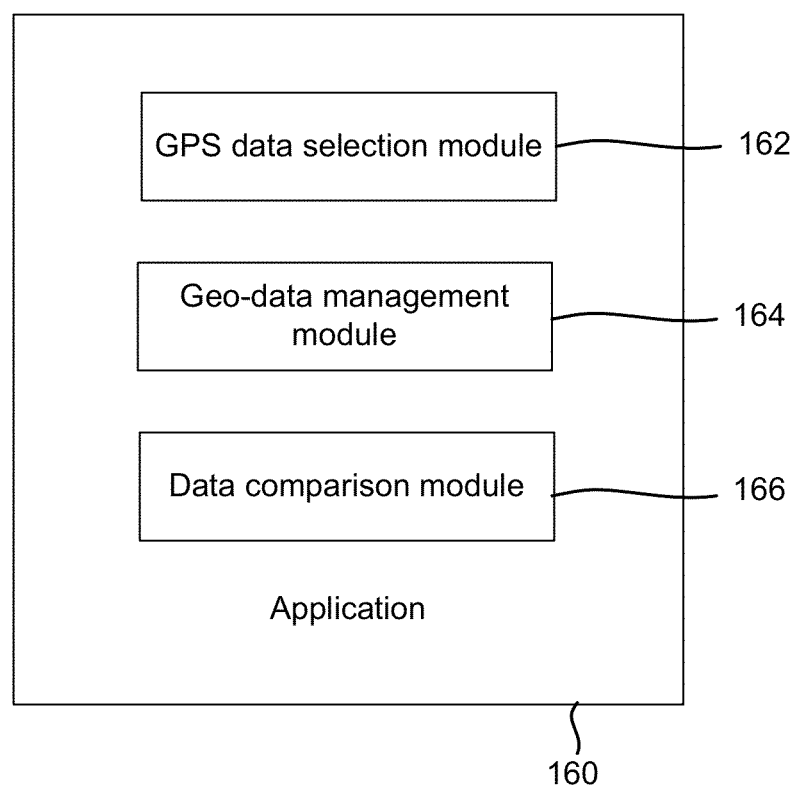
FIG. 1B illustrates an exemplary application for processing GPS data.

FIG. 1B illustrates an exemplary application for processing GPS data. The application of FIG. 1B may provide more detail for application 160 of FIG. 1. Application 160 may include a GPS data selection module 162, geo-data management module 164, and data comparison module 166. The GPS data selection module 162 is stored in memory and may be executed to receive GPS data from positional server 140, select a portion of the GPS data to use in determining the accuracy of positional device 115, and perform GPS data management functions. Geo-Data Management Module 164 is stored in memory and may be executed to access and process Geo-Data for comparison and processing along with GPS Data, as well as perform other data management functions for the geo-data. Data Comparison Module 166 is stored in memory and may be executed to compare selective GPS data and Geo data and provide output through an interface of Application Server 155.

It is intended that each of modules 162, 164, and 166 may be made of one or more modules, may be combined, and that more or fewer software modules may be used for determining the accuracy of a positioning device 115. The modules may be stored and executed on application server 155, on a mobile device (not illustrated in FIG. 1A), or distributed over several computing devices (servers, mobile devices, and so forth).

Figure 2:
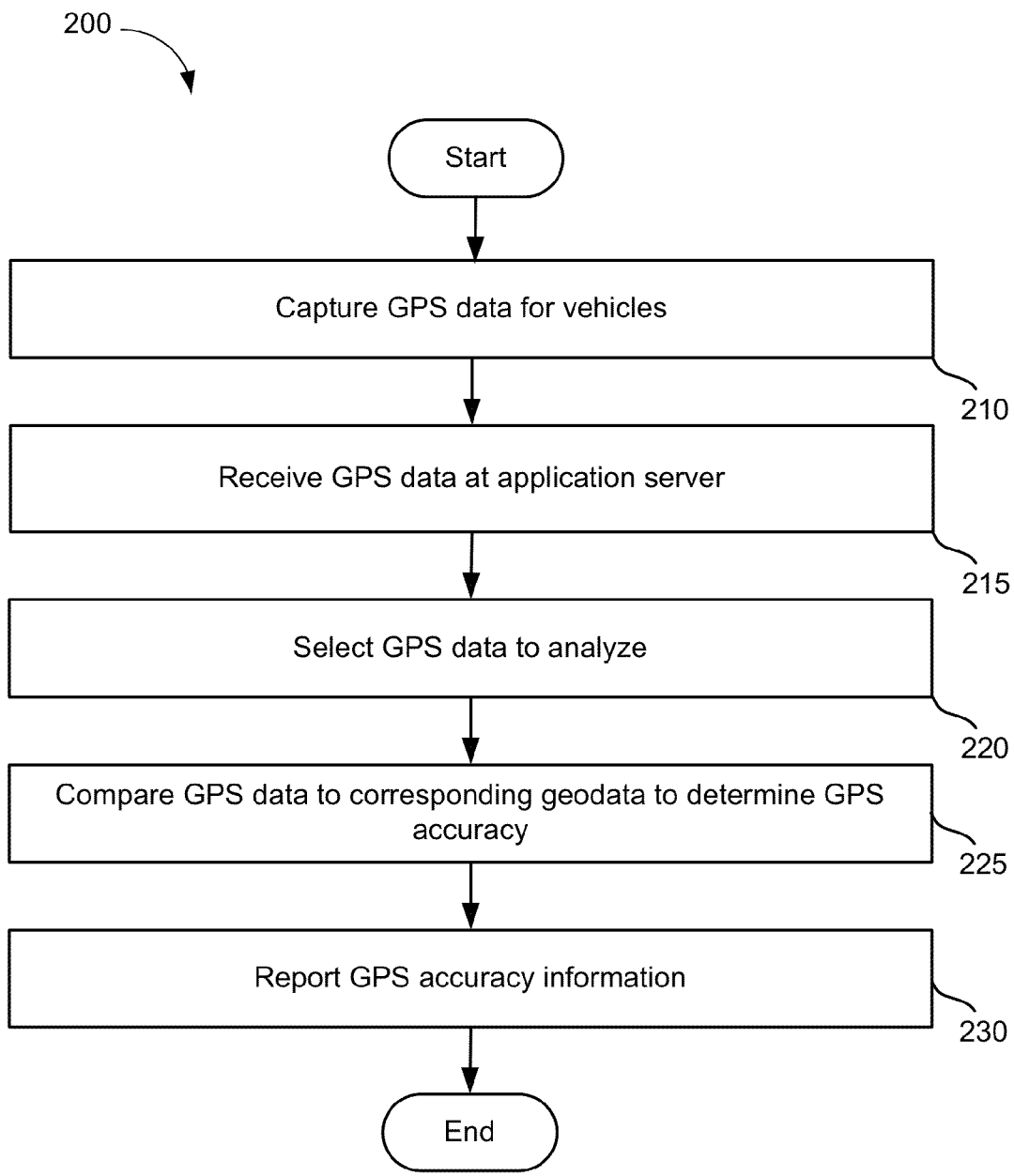
FIG. 2 illustrates an exemplary method for determining the accuracy of a GPS device.

FIG. 2 illustrates an exemplary method for determining the accuracy of a GPS device. The method of FIG. 2 begins with capturing GPS Data for one or more vehicles at step 210. GPS data may be captured using one or more positioning devices 115 on each vehicle 110. The GPS data may be captured for one vehicle or several vehicles, as well as one or more fleets of vehicles. Capturing the data may include receiving satellite signals at positioning device 115, determining a location for the positioning device 115 from the signals, and transmitting location information by cellular communication system 120 to positioning server 140.

The GPS data may be received at the application server at step 215. The GPS data captured at Vehicle 110 may be received by Application Server 155 via network 145 and network server 150. In addition to the GPS signal data, the GPS data transmitted from vehicle 110 to, ultimately, application 160 may also include the calculated location, heading and speed of positioning device 115. Vehicle identification information, positional device identification, and a time stamp for when the data was collected and may also be transmitted as GPS data to application server 160.

GPS data is selected for analysis as step 220. The selected GPS data may be most likely to be useful in detecting the accuracy of positioning device 115. For example, the selected GPS data may represent a location that is nearby an isolated location for which geo-data is available. Selecting GPS data to analyze is discussed in more detail below with reference to FIG. 3.

The selected GPS data is compared to corresponding geo-data to determine the accuracy of the positioning system associated with the GPS data at step 225. The comparison of the GPS data to the Geo-Data may be performed in any of one or more ways. For example, GPS data may include a location, heading and speed. The location and heading may be compared to geo-data location data and a heading derived from the direction of a road associated with the location. For example, at an isolated location not in proximity to other roads and at which the position data was collected for the moving vehicle, there is a low likelihood that the GPS data could be confused with a multiple roads. This allows for a more accurate comparison with geo data for the correct corresponding road. GPS speed data may be compared to expected speed information for a geo-data roadway. Comparing GPS data to corresponding Geo-Data is discussed in more detail with respect to FIG. 4.

Once the GPS data is compared to the corresponding Geo-Data, the GPS accuracy information is reported at step 230. The data may be reported in a variety of levels, for example by vehicle fleet, vehicle type, individual vehicle, position device installer, position device model, time of day, location of device, and other data. Some data, such as the mean accuracy and standard deviation of accuracy for speed and heading may be calculated by application 160. A sorting of the data by positional device installer may be achieved, for example, by accessing a table that correlates the installer for each positional device identification from which GPS data is received.

Figure 3:
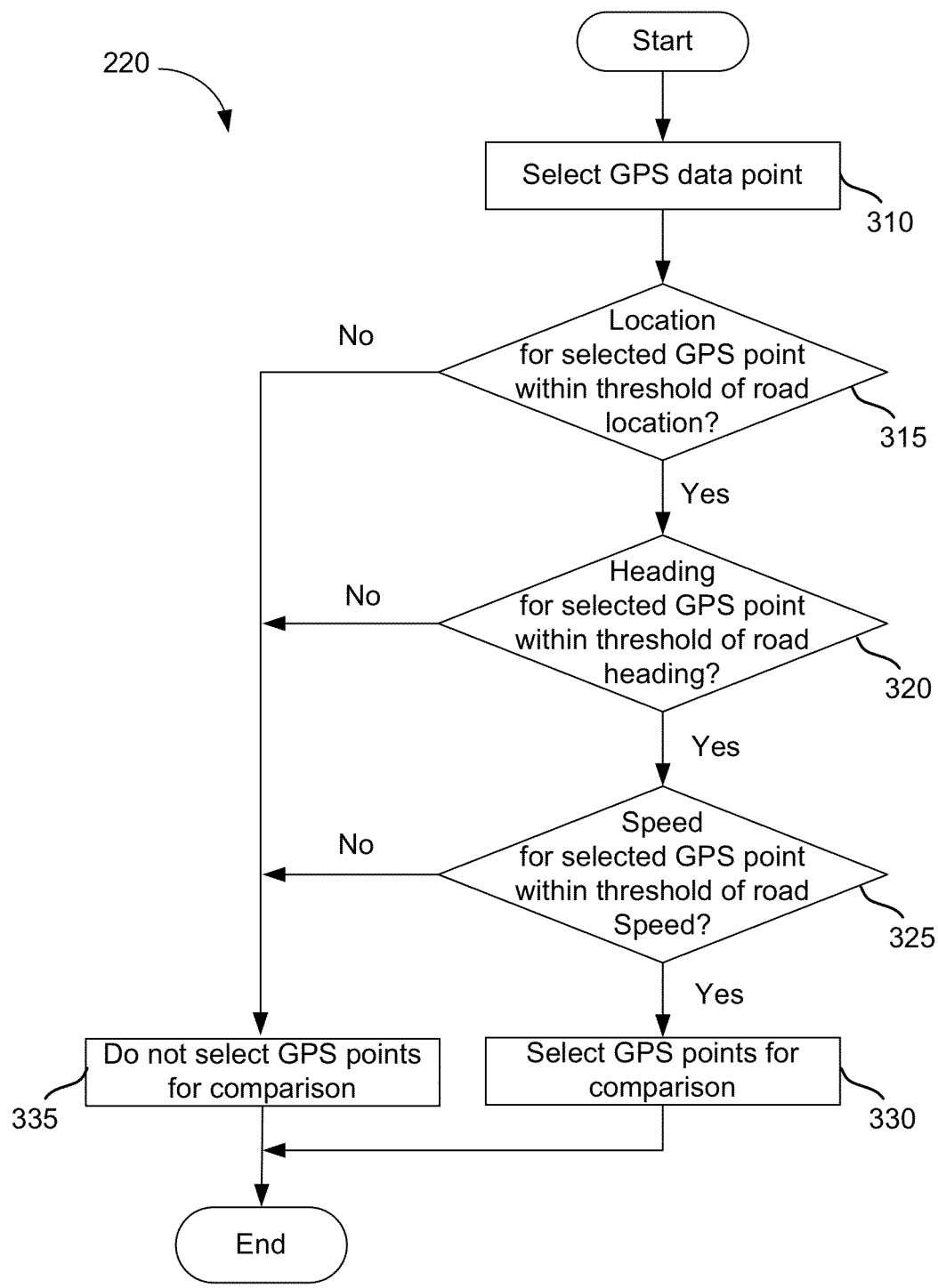
FIG. 3 illustrates an exemplary method for selecting GPS data to analyze.

The method of FIG. 3 illustrates an exemplary process for selecting GPS data to analyze. Method of FIG. 3 provides more detail for step 220 of the method of FIG. 2. First, a GPS data point to be analyzed is selected at step 310. The GPS data point to be analyzed may be selected in a remote area having only one road within a threshold distance, such as fifty feet, a hundred feet, or some other distance. A determination is then made as to whether the location for the selected GPS point is within a threshold of a geo-data point location according to geo-data in step 315. For example, the selected GPS point may be 50 feet, 60 feet, 70 feet, 100 feet, or some other threshold distance away from the nearest point (on a road) in the geo-data. If the location for the selected GPS point is not within a threshold of a geo-data point, the selected GPS point is not used for comparing with the geo-data and the method of FIG. 3 ends with respect to that GPS point. Additional GPS data points may be selected and processed according to steps 315 through 335.

If the location for the selected GPS point is within a threshold of the geo-data point, a determination is made at step 320 as to whether the heading for the selected GPS point is within a threshold of a geo-data point heading at step 320. The heading threshold may be a certain range, for example within ninety degrees. The heading of the geo-data point may be determined from a series of points around the particular point being considered (for example, the line formed by adjacent points along the same road). If the heading for the selected GPS point is within a threshold of the geo-data point heading, the method of FIG. 3 continues to step 325. If the selected GPS point heading is not within a threshold of the geo-data point heading, then the selected GPS point may not be selected for comparison with the geo-data an the method ends at step 335.

A determination is made as to whether the speed for the selected GPS point is within a threshold of the geo-data point road speed at step 325. The speed for the GPS data points is communicated in the GPS data received from the positional device 115. The speed for the geo-data point may be entered manually, looked up in a table containing the posted speed limit for the road, or accessed in another manner. In some embodiments, the threshold may be set at 10 or 20% below of the posted speed limit, within 10 mph or 20 mph of the posted speed limit, or some other threshold. If the speed for the selected GPS is not within a threshold of the geo-data point speed, the GPS point is not selected for comparison at step 335. If the speed is within a threshold of the geo-data point speed, the selected GPS point will be used for comparison at step 330.

In the method of FIG. 3, three comparisons were performed to determine if a GPS point would be suitable to compare with geo-data point. Using all three comparisons was discussed for exemplary purposes only. Selecting GPS data to compare with geo-data may be performed using one, two or all three of the comparisons, as well as based on other comparisons or conditions which utilize the data available to application 160.

Figure 4:
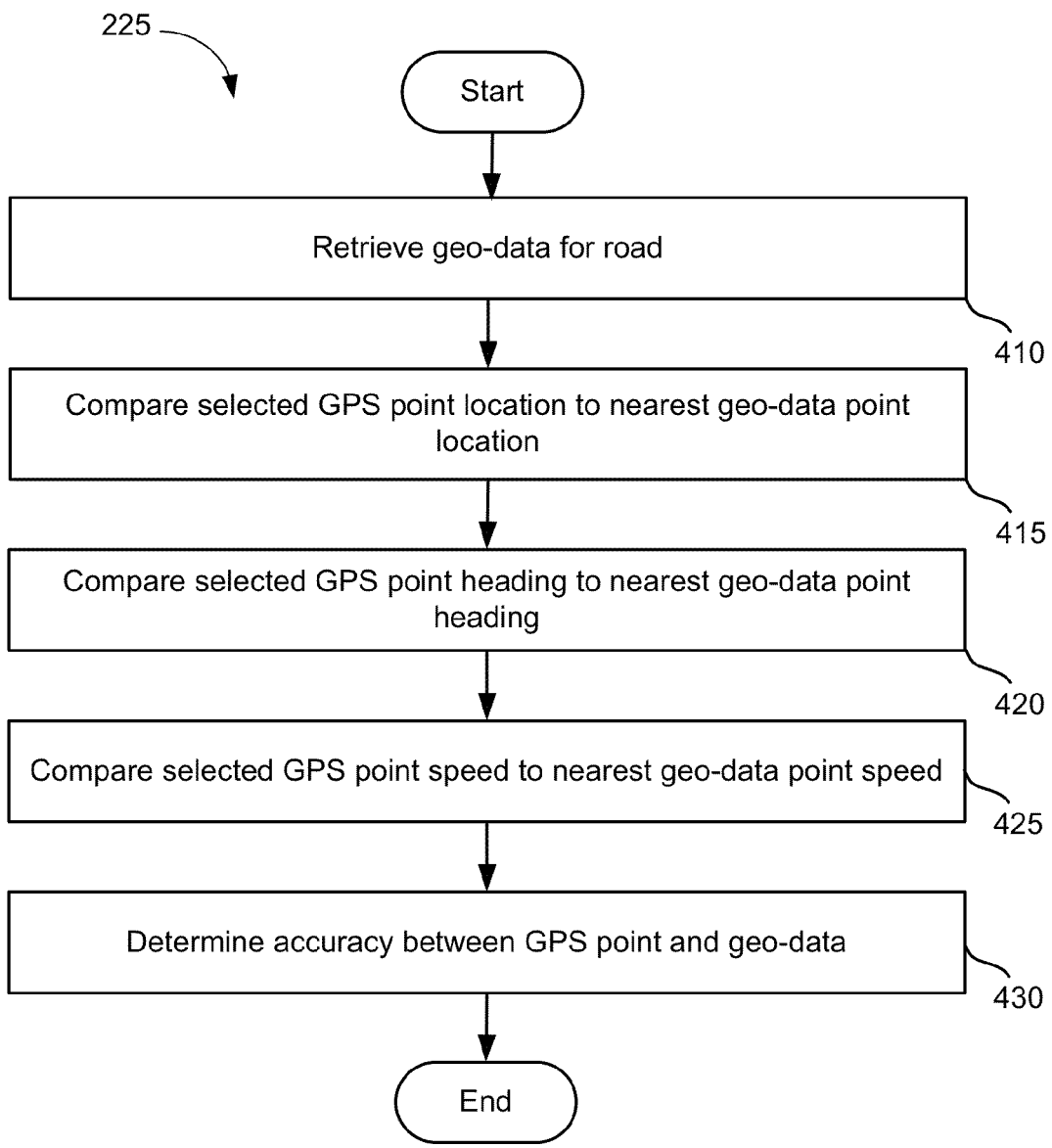
FIG. 4 illustrates an exemplary method for comparing GPS data to geo-data.

FIG. 4 is a method which illustrates an exemplary process for comparing GPS data points to geo-data points. The method in FIG. 4 provides more detail for step 225 in the method of FIG. 2. First, geo-data points are retrieved for a road at step 410. The retrieved geo-data points may include the one or more points within a threshold of the GPS data points (see discussion of FIG. 3) as well as surrounding points or points along the same road.

One of the selected GPS point locations is then compared to the nearest geo-data point location at step 415. The locations can be compared in terms of horizontal distance apart and vertical distance apart. The selected GPS point heading is then compared to a geo-data point heading at step 420. The GPS point heading is accessed from the GPS data transmitted from positional device 115. The geo-data heading data may be determined from multiple geo-data points for the same road. The speed for the GPS point is then compared to the speed of the geo-data point at step 425.

The difference for each comparison of steps 415-425 is recorded and the accuracy between the GPS point and geo-data is determined at step 430. The accuracy may be determined by several means. For example, the accuracy may be determined by calculating a percentage difference of the expected location of the geo-data and the actual location of the GPS data. The accuracy may also be determined by calculating the mean and standard deviation of the accuracy, calculated as a percentage difference, of several comparisons between the GPS data points and geo-data points along a road.

Figure 5:
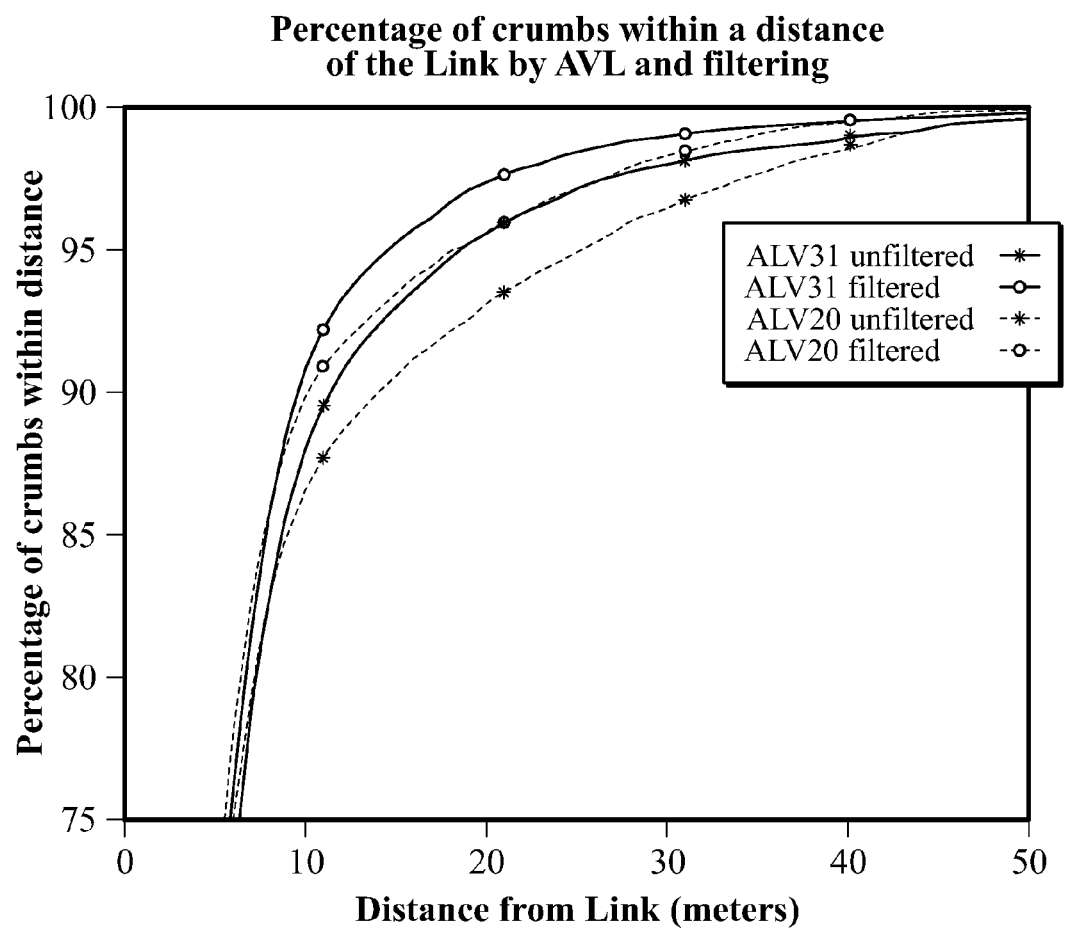
FIG. 5 is a chart plotting distance vs. percentage of devices determined to be within a distance.

FIG. 5 illustrates a chart plotting distance versus percentage of devices that were determined to be within a distance of a geo-data road. As illustrated, over eighty-five percent of the positional devices sampled were determined to be within 10 meters from the geo-data road most closely associated with the GPS data points reported by the positional device. The present invention also reports that ninety-five percent of the positional devices provided data that was within 20 meters from the geo-data road.

Figure 6:
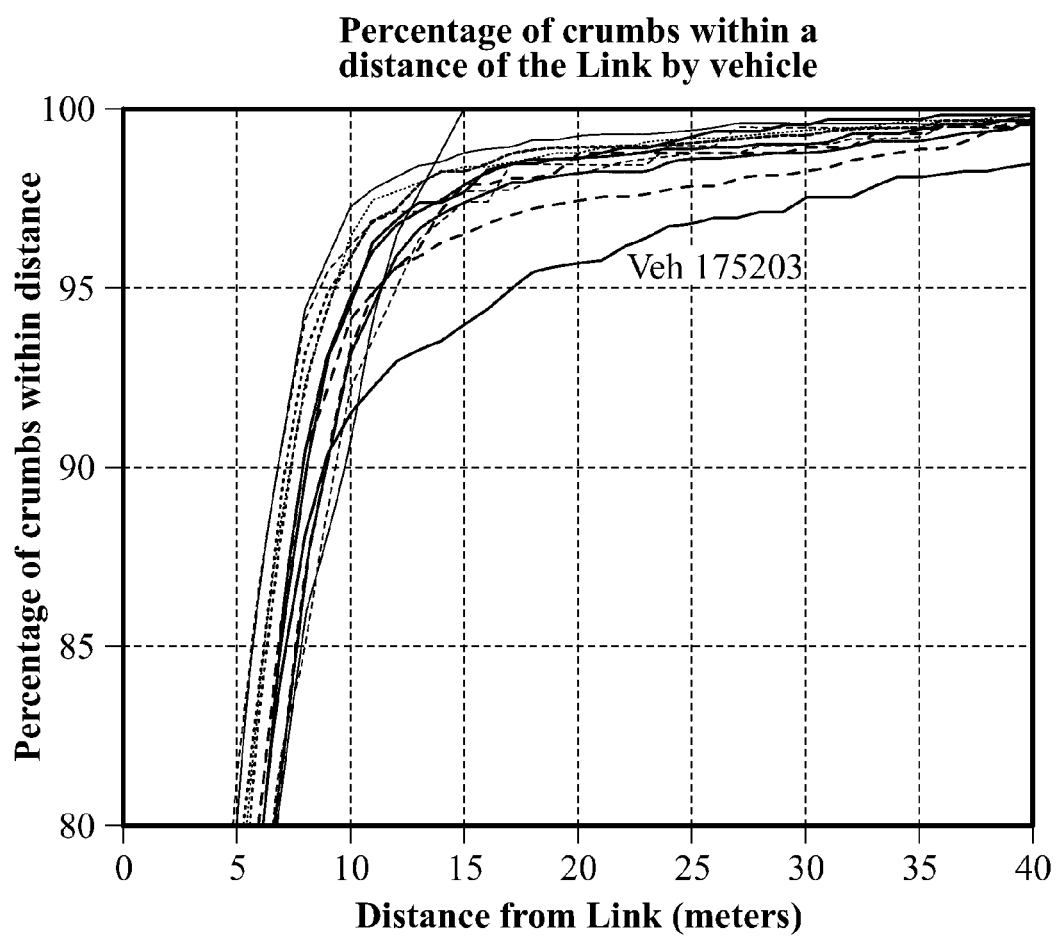
FIG. 6 is another chart plotting distance vs. percentage of devices determined to be within a distance.

FIG. 6 illustrates another chart plotting distance versus percentage of devices which are determined to be within a distance. As illustrated in FIG. 6, a particular vehicle, identified as "Veh 175203", is associated with GPS data that is not as accurate as other vehicles (indicated by other lines in the chart of FIG. 6). As such, it is determined that the positional device installed on "Veh 175203" is likely not performing as intended, and the owner of the vehicle can be notified accordingly.

Figure 7:
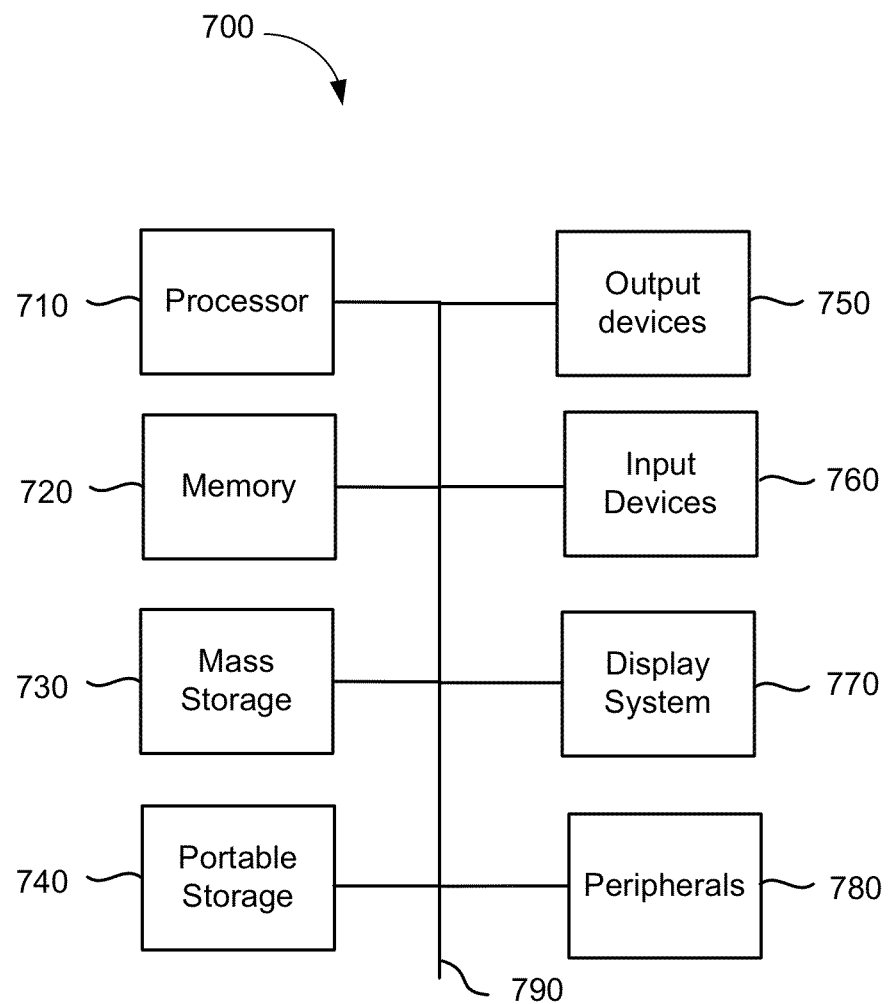
FIG. 7 is a block diagram of an exemplary system for implementing a computing device.

FIG. 7 illustrates an exemplary computing system 700 that may be used to implement a computing device for use with the present technology. System 700 of FIG. 7 may be implemented in the contexts of the likes of positional sever 140, network server 150, and application server 160. The computing system 700 of FIG. 7 includes one or more processors 710 and memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a display system 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information, and processes the information for output to the display device.

Peripherals 780 may include any type of computer support device to add additional functionality to the computer system. For example, peripheral device(s) 780 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including UNIX, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for determining accuracy of positional data, comprising:
    receiving positional data from a positional device associated with a vehicle, wherein the vehicle is traversing a roadway as the positional device generates the positional data;
    storing the received positional data in a memory of a computing device;
    selecting positional data points from the received positional data;
    comparing the selected positional data points to geo-data points for the roadway over which the vehicle was traversing during generation of the positional data by the positional device associated with the vehicle;
    determining an accuracy of the positional data points based on the comparison against the geo-data points; and
    generating a report including the determined accuracy.

2. The method of claim 1, wherein comparing includes comparing a positional data point location to a geo-data point location.

3. The method of claim 1, wherein comparing includes comparing a positional data point heading to a geo-data point heading.

4. The method of claim 1, wherein comparing includes comparing a positional data point direction to a geo-data point direction.

5. The method of claim 1, wherein selecting a positional data point includes determining that the position data location is within a threshold of a geo-data point location.

6. The method of claim 1, wherein selecting a positional data point includes determining that the position data heading is within a threshold of a geo-data point heading.

7. The method of claim 1, wherein selecting a positional data point includes determining that the position data speed is within a threshold of a geo-data point speed.

8. The method of claim 1, wherein positional data points include global positioning system (GPS) data obtained by the positional device.

9. A system for determining accuracy of positional data by a computing device, the system comprising:
    a processor of the computing device;
    a memory coupled to the processor; and
    an application stored in the memory, wherein execution of the application by the processor:
        receives positional data from a positional device associated with a vehicle, wherein the vehicle is traversing a roadway as the positional device generates the positional data,
        stores the received positional data in the memory of the computing device;
        selects positional data points from the received positional data,
        compares the positional data points to geo-data points for the roadway over which the vehicle was traversing during generation of the positional data by the positional device associated with the vehicle,
        determines an accuracy of the positional data points based on the comparison against the geo-data points, and
        generates a report including the determined accuracy.

10. The system of claim 9, wherein comparing includes comparing a positional data point location to a geo-data point location.

11. The system of claim 9, wherein comparing includes comparing a positional data point heading to a geo-data point heading.

12. The system of claim 9, wherein comparing includes comparing a positional data point direction to a geo-data point direction.

13. The system of claim 9, wherein selecting a positional data point includes determining that the position data location is within a threshold of a geo-data point location.

14. The system of claim 9, wherein selecting a positional data point includes determining that the position data heading is within a threshold of a geo-data point heading.

15. The system of claim 9, wherein selecting a positional data point includes determining that the position data speed is within a threshold of a geo-data point speed.

16. The system of claim 9, wherein positional data points include global positioning system (GPS) data obtained by the positional device.

17. A non-transitory computer readable storage medium of a computing device having embodied thereon a program, the program being executable by a processor of the computing device to perform a method for determining accuracy of positional data, the method comprising:
    receiving positional data from a positional device associated with a vehicle, wherein the vehicle is traversing a roadway as the positional device generates the positional data;
    storing the received positional data in a memory of the computing device;
    selecting positional data points from the received positional data;
    comparing the selected positional data points to geo-data points for the roadway over which the vehicle was traversing during generation of the positional data by the positional device associated with the vehicle;
    determining the accuracy of the positional data points based on the comparison against the geo-data points; and
    generating a report including the determined accuracy.

18. The non-transitory computer readable storage medium of claim 17, wherein comparing includes comparing a positional data point location to a geo-data point location.

19. The non-transitory computer readable storage medium of claim 17, wherein comparing includes comparing a positional data point heading to a geo-data point heading.

20. The non-transitory computer readable storage medium readable storage medium of claim 17, wherein comparing includes comparing a positional data point direction to a geo-data point direction.

* * * * *